(12) United States Patent
Java et al.

(10) Patent No.: US 12,124,497 B1
(45) Date of Patent: Oct. 22, 2024

(54) FORM STRUCTURE SIMILARITY DETECTION

(71) Applicant: Adobe Inc., San Jose, CA (US)

(72) Inventors: Abhinav Java, Noida (IN); Surgan Jandial, Noida (IN); Shripad Vilasrao Deshmukh, Delhi (IN); Milan Aggarwal, Pitampura (IN); Mausoom Sarkar, Noida (IN); Balaji Krishnamurthy, Noida (IN); Arneh Jain, Calicut (IN)

(73) Assignee: Adobe Inc., San Jose, CA (US)

( * ) Notice: Subject to any disclaimer, the term of this patent is extended or adjusted under 35 U.S.C. 154(b) by 112 days.

(21) Appl. No.: 18/190,686

(22) Filed: Mar. 27, 2023

(51) Int. Cl.
  *G06F 16/383* (2019.01)
  *G06F 16/332* (2019.01)
  *G06V 30/19* (2022.01)
  *G06V 30/412* (2022.01)

(52) U.S. Cl.
  CPC .......... *G06F 16/383* (2019.01); *G06F 16/332* (2019.01); *G06V 30/19147* (2022.01); *G06V 30/412* (2022.01)

(58) Field of Classification Search
  None
  See application file for complete search history.

(56) References Cited

U.S. PATENT DOCUMENTS

| | | | | |
|---|---|---|---|---|
| 2006/0143280 A1* | 6/2006 | Ohba | ..................... | G06F 40/109 709/206 |
| 2011/0276390 A1* | 11/2011 | Li | ..................... | G06Q 30/0243 705/14.42 |
| 2016/0314109 A1* | 10/2016 | Singh | ..................... | G06F 40/131 |
| 2017/0329759 A1* | 11/2017 | Fujioka | ..................... | G06F 40/174 |
| 2020/0159820 A1* | 5/2020 | Rodriguez | ..................... | G06F 40/137 |

(Continued)

OTHER PUBLICATIONS

Aggarwal, Milan, et al., "Multi-Modal Association based Grouping for Form Structure Extraction", Cornell University arXiv, arXiv.org [retrieved Feb. 20, 2023]. Retrieved from the Internet <https://arxiv.org/pdf/2107.04396.pdf>., Jul. 9, 2021, 10 Pages.

(Continued)

*Primary Examiner* — Thu N Nguyen
(74) *Attorney, Agent, or Firm* — FIG. 1 Patents

(57) ABSTRACT

Form structure similarity detection techniques are described. A content processing system, for instance, receives a query snippet that depicts a query form structure. The content processing system generates a query layout string that includes semantic indicators to represent the query form structure and generates candidate layout strings that represent form structures from a target document. The content processing system calculates similarity scores between the query layout string and the candidate layout strings. Based on the similarity scores, the content processing system generates a target snippet for display that depicts a form structure that is structurally similar to the query form structure. The content processing system is further operable to generate a training dataset that includes image pairs of snippets depicting form structures that are structurally similar. The content processing system utilizes the training dataset to train a machine learning model to perform form structure similarity matching.

20 Claims, 12 Drawing Sheets

(56) References Cited

U.S. PATENT DOCUMENTS

| | | | | |
|---|---|---|---|---|
| 2020/0311209 | A1* | 10/2020 | Mokashi | G06F 40/30 |
| 2020/0311413 | A1* | 10/2020 | Zhang | G06F 18/24 |
| 2023/0177540 | A1* | 6/2023 | Furukawa | G06Q 30/0203 |
| | | | | 705/7.32 |
| 2024/0153194 | A1* | 5/2024 | Liu | G06F 40/30 |

OTHER PUBLICATIONS

Atallah, Mikhail, et al., "Algorithms and Theory of Computation Handbook Second Edition Special Topics and Techniques", Chapman & Hall/CRC, Boca Raton, Fla. [retrieved Mar. 29, 2023]. Retrieved from the Internet <https://digital.library.tu.ac.th/tu_dc/frontend/Info/item/dc:9426>. Ref 1 of 4, 2009, 932 pages.

Atallah, Mikhail, et al., "Algorithms and Theory of Computation Handbook Second Edition Special Topics and Techniques", Chapman & Hall/CRC, Boca Raton, Fla. [retrieved Mar. 29, 2023]. Retrieved from the Internet <https://digital.library.tu.ac.th/tu_dc/frontend/Info/item/dc:9426>. Ref 2 of 4, 2009, 932 pages.

Atallah, Mikhail, et al., "Algorithms and Theory of Computation Handbook Second Edition Special Topics and Techniques", Chapman & Hall/CRC, Boca Raton, Fla. [retrieved Mar. 29, 2023]. Retrieved from the Internet <https://digital.library.tu.ac.th/tu_dc/frontend/Info/item/dc:9426>. Ref 3 of 4, 2009, 932 pages.

Atallah, Mikhail, et al., "Algorithms and Theory of Computation Handbook Second Edition Special Topics and Techniques", Chapman & Hall/CRC, Boca Raton, Fla. [retrieved Mar. 29, 2023]. Retrieved from the Internet <https://digital.library.tu.ac.th/tu_dc/frontend/Info/item/dc:9426>. Ref 4 of 4, 2009, 932 pages.

Chen, Ding-Jie, et al., "Adaptive Image Transformer for One-Shot Object Detection", IEEE/CVF Conference on Computer Vision and Pattern Recognition [retrieved Jan. 3, 2023]. Retrieved from the Internet <https://openaccess.thecvf.com/content/CVPR2021/papers/Chen_Adaptive_Image_Transformer_for_One-Shot_Object_Detection_CVPR_2021_paper.pdf>., Jun. 2021, 10 Pages.

Cheng, Jiaxin, et al., "QATM: Quality-Aware Template Matching for Deep Learning", Cornell University arXiv, arXiv.org [retrieved Jan. 3, 2023]. Retrieved from the Internet <https://arxiv.org/pdf/1903.07254.pdf>., Apr. 9, 2019, 10 Pages.

Everingham, Mark, et al., "The PASCAL Visual Object Classes (VOC) Challenge", International journal of computer vision, vol. 88, No. 2 [retrieved Jan. 31, 2023]. Retrieved from the Internet <http://citeseerx.ist.psu.edu/viewdoc/download?doi=10.1.1.167.6629&rep=rep1&type=pdf>., Sep. 9, 2009, 34 pages.

Harley, Adam, et al., "Evaluation of Deep Convolutional Nets for Document Image Classification and Retrieval", Cornell University arXiv, arXiv.org [retrieved Jan. 3, 2023]. Retrieved from the Internet <https://arxiv.org/pdf/1502.07058.pdf>., Feb. 25, 2015, 9 Pages.

He, Kaiming, et al., "Deep Residual Learning for Image Recognition", arXiv Preprint, arXiv.org [retrieved Mar. 15, 2023]. Retrieved from the Internet <https://arxiv.org/pdf/1512.03385.pdf>., Dec. 10, 2015, 12 pages.

Hisham, M.B., et al., "Template Matching using Sum of Squared Difference and Normalized Cross Correlation", IEEE Student Conference on Research and Development [retrieved Jan. 3, 2023]. Retrieved from the Internet <10.1109/SCORED.2015.7449303>., Dec. 2015, 5 Pages.

Hsieh, Ting-I, et al., "One-Shot Object Detection with Co-Attention and Co-Excitation", Cornell University arXiv, arXiv.org [retrieved Jan. 3, 2023]. Retrieved from the Internet <https://arxiv.org/pdf/1911.12529.pdf>., Nov. 28, 2019, 10 Pages.

Huang, Yupan, et al., "LayoutLMv3: Pre-training for Document AI with Unified Text and Image Masking", Cornell University arXiv, arXiv.org [retrieved Jan. 3, 2023]. Retrieved from the Internet <https://arxiv.org/pdf/2204.08387.pdf>., Jul. 19, 2022, 10 Pages.

Jaume, Guillaume, et al., "FUNSD: A Dataset for Form Understanding in Noisy Scanned Documents", Cornell University arXiv, arXiv.org [retrieved Jan. 3, 2023]. Retrieved from the Internet <https://arxiv.org/pdf/1905.13538.pdf>., Oct. 29, 2019, 6 Pages.

Li, Junlong, et al., "DiT: Self-supervised Pre-training for Document Image Transformer", Cornell University arXiv, arXiv.org [retrieved Jan. 3, 2023]. Retrieved from the Internet <https://arxiv.org/pdf/2203.02378.pdf>., Jul. 19, 2022, 10 Pages.

Lin, Tsung-Yi, et al., "Microsoft COCO: Common Objects in Context", Cornell University arXiv, arXiv.org [retrieved Jun. 14, 2023]. Retrieved from the Internet <https://arxiv.org/pdf/1405.0312.pdf>., Feb. 21, 2015, 15 Pages.

Michaelis, Claudio, et al., "One-shot segmentation in clutter", Proceedings of the 35th International Conference on Machine Learning [retrieved Jan. 3, 2023]. Retrieved from the Internet <http://proceedings.mlr.press/v80/michaelis18a/michaelis18a.pdf>., 2018, 10 Pages.

Oyallon, Edouard, et al., "An analysis of the surf method", Image Processing On Line [retrieved Jan. 3, 2023]. Retrieved from the Internet <https://www.ipol.im/pub/art/2015/69/article_lr.pdf>., Jul. 20, 2015, 43 Pages.

Ren, Shaoqing, et al., "Faster R-CNN: Towards Real-Time Object Detection with Region Proposal Networks", Cornell University arXiv, arXiv.org [retrieved Jan. 3, 2023]. Retrieved from the Internet <https://www.ee.bgu.ac.il/~rrtammy/DNN/reading/FastSun.pdf>., Sep. 13, 2015, 10 pages.

Ruff, Lukas, et al., "Deep One-Class Classification", Proceedings of the 35th International Conference on Machine Learning [retrieved Jan. 3, 2023]. Retrieved from the Internet <https://ls9-www.cs.tu-dortmund.de/publications/CML2018.pdf>., 2018, 10 Pages.

Sarkar, Mausoom, et al., "Document Structure Extraction using Prior based High Resolution Hierarchical Semantic Segmentation", Cornell University arXiv, arXiv.org [retrieved Feb. 20, 2023]. Retrieved from the Internet <https://arxiv.org/pdf/1911.12170.pdf>., Sep. 17, 2020, 18 Pages.

Song, Kaitao, et al., "MPNet: Masked and Permuted Pre-training for Language Understanding", Cornell University arXiv, arXiv.org [retrieved Jan. 3, 2023]. Retrieved from the Internet <https://arxiv.org/pdf/2004.09297.pdf>., Nov. 2, 2020, 14 Pages.

Vaswani, Ashish, et al., "Attention Is All You Need", Cornell University arXiv Preprint, arXiv.org [retrieved Mar. 28, 2023]. Retrieved from the Internet <https://arxiv.org/pdf/1706.03762.pdf>., Dec. 6, 2017, 15 pages.

Wu, Jian, et al., "A Comparative Study of SIFT and its Variants", Measurement Science Review; Bratislava vol. 13, No. 3 [retrieved Jan. 3, 2023]. Retrieved from the Internet <https://kd.nsfc.gov.cn/paperDownload/1000006777694.pdf>., Jun. 2013, 10 Pages.

Xu, Yiheng, et al., "LayoutLM: Pre-training of Text and Layout for Document Image Understanding", Cornell University arXiv, arXiv.org [retrieved Jan. 3, 2023]. Retrieved from the Internet <https://arxiv.org/pdf/1912.13318.pdf>., Jun. 16, 2020, 9 Pages.

Yang, Hanqing, et al., "Balanced and Hierarchical Relation Learning for One-Shot Object Detection", IEEE/CVF [retrieved Jan. 3, 2023]. Retrieved from the Internet <https://openaccess.thecvf.com/content/CVPR2022/papers/Yang_Balanced_and_Hierarchical_Relation_Learning_for_One-Shot_Object_Detection_CVPR_2022_paper.pdf>., Jun. 2022, 10 Pages.

Yoo, Jae-Chern, et al., "Fast Normalized Cross-Correlation", Circuits Systems And Signal Processing [retrieved Jan. 3, 2023]. Retrieved from the Internet <http://www.scribblethink.org/Work/nvisionInterface/nip.pdf>., Dec. 2009, 7 Pages.

Zhong, Xu, et al., "PubLayNet: largest dataset ever for document layout analysis", Cornell University arXiv, arXiv.org [retrieved Jan. 3, 2023]. Retrieved from the Internet <https://arxiv.org/pdf/1908.07836.pdf>., Aug. 16, 2019, 8 Pages.

\* cited by examiner

100

Have you ever lived in northern Ireland?
Yes ☐ - go to question B26    No ☐ - go to part C

— 122

— 124

D11. When did you arrive in the United Kingdom?
D D  m m  Y Y Y Y

D12. What is your current immigration status in the United Kingdom?

— 118

D13. Have you ever stayed in the United Kingdom beyond the end of your period of leave?
Yes ☐ - go to question D14    No ☐ - go to question D15

110

112

Computing Device 102

Content Processing System 104

Input Data 120 --→ Structure Module 116 --→ Target Snippet 118

108

Digital Content 106

Network 114

Did you successfully complete the course?
☐ Yes  ☐ No  (If no, please give reason below)
_____
_____
_____
_____

310

`<text><\n><widget><text><widget><text><text><\n><widget><\n><widget><\n><widget>`

304

312

| Family Name (as written in your passport): | |
| Given Name(s)(as written in your passport): | |
| Date of Birth (dd/mm/yyyy): | |
| Passport Number: | |

314

`<text><widget><\n><text><widget><\n><text><widget><\n><text><widget>`

306

316

| 21. | Check "yes", "no", or "unknown" to indicate if a PD adequacy measurement was done between OCT 1, 2004 through MAR 31, 2005. |
| 21A: | Enter the first date on which PD adequacy of dialysis was assessed for the first measure obtained between OCT 1, 2004 through MAR 31, 2005. DO NOT record more than one PD adequacy measurement done for any one month. |
| 21B: | Check the modality of peritoneal dialysis this patient was on at the time the corresponding adequacy of dialysis measure was obtained. CHECK either CAPD or Cycler. CAPD includes patients with one overnight exchange using an assist device. Cycler includes patients using an automated device for exchanges. |
| 21C: | Enter the patient's weight (with abdomen empty) at the clinic/facility visit when the adequacy measurements were obtained, circle lbs or kgs as appropriate. |
| 21D: | Enter the TOTAL WEEKLY Kt/V___ for the first adequacy measurement indicated on 21A between OCT 1, 2004 through MAR 31, 2019 NOTE: Whether or not you have a value for weekly Kt/V___ for this adequacy assessment, please complete the corresponding values for questions 21B-21I for 24-hour dialysate volume, 24-hour dialysate urea and question 21E for 24-hour urine volume. If the patient is not anuric, complete the corresponding value for question 21L, the 24-hour urine urea, if this value is available. Enter NF/NP for all values when not listed or not performed. If your unit calculates a daily Kt/V___, multiply this result by 7.0 and enter the result in the appropriate space(s). If this patient did not dialyze each day of the week, then multiply the daily Kt/V___ by the number of days the patient did dialysis. |

318

`<text><text><\n><text><text><\n><text><text><\n><text><text><\n><text><text>`

Have you previously applied or currently applying for admission at other Australian education providers?

☐ Yes  ☐ No  (If yes, please give details of the outcome below)

_____
_____

508

Did you successfully complete the course?
☐ Yes  ☐ No  (If no, please give reason below)

_____
_____
_____

504

510

| Drug Name | Drug Tier | Requirements /Limits |
|---|---|---|
| kionex (with sorbitol) | 3 | MO |
| lactated ringers irrigation | 4 | MO |
| lanthanum oral tablet, chewable 1,000 mg | 3 | MO |
| levocarnitine (with sugar) | 3 | B/D PAR; MO |
| levocarnitine oral tablet | 3 | MO |
| midodrine | 4 | MO |
| neomycin-polymyxin b gu | 4 | MO |
| NICOTROL NS | 3 | MO; QLL (120 per 30 days) |
| NORTHERA ORAL CAPSULE 100 MG | 5 | PAR; MO; QLL (540 per 30 days) |
| NORTHERA ORAL CAPSULE 200 MG | 5 | PAR; MO; QLL (270 per 30 days) |

512

| Drug Name | Drug Tier | Requirements /Limits |
|---|---|---|
| JAKAFI ORAL TABLET 20 MG | 5 | PAR; MO; QLL (75 per 30 days) |
| JAKAFI ORAL TABLET 25 MG | 5 | PAR; MO; QLL (60 per 30 days) |
| JAKAFI ORAL TABLET 5 MG | 5 | PAR; MO; QLL (300 per 30 days) |
| JEVTANA | 5 | PAR; MO |
| KADCYLA | 5 | PAR; MO |
| KEYTRUDA INTRAVENOUS SOLUTION | 5 | PAR; MO |
| KISQALI FEMARA CO-PACK ORAL TABLET 200 MG/DAY(200 MG X 1)-2.5 MG | 5 | PAR; MO; QLL (49 per 28 days) |
| KISQALI FEMARA CO-PACK ORAL TABLET 400 MG/DAY(200 MG X 2)-2.5 MG | 5 | PAR; MO; QLL (70 per 28 days) |
| KISQALI FEMARA CO-PACK ORAL TABLET 600 MG/DAY(200 MG X 3)-2.5 MG | 5 | PAR; MO; QLL (91 per 28 days) |
| KISQALI ORAL TABLET 200 MG/DAY (200 MG X 1) | 5 | PAR; MO; QLL (21 per 21 days) |

*Fig. 5*

```
Algorithm 1 Query Mining
Input: data, F                    ▷ F is the list of all forms
Output: Q                         ▷ dict of query objects
 1:  Q ← {}                       ▷ init query hashmap
 2:  n ← 5                        ▷ random number
 3:  for doc in F do
 4:    for obj in data.layout(doc) do
 5:      if len(data.objs(doc)) > 1 then
 6:        if rand.gen() % n == 0 then
 7:          Q[doc].insert(obj)
 8:        end if
 9:      end if
10:    end for
11:  end for
12:  End
13:  where data contains the hierarchical information
     about the dataset containing its constituent element
     positions and layout strings.
```

```
Algorithm 2 Query Matching
Input: Q, data, F                 ▷ F is list of docs, Q are queries
Output: dataset                   ▷ dict of query-target objects
 1:  dataset ← {}                 ▷ init output hashmap
 2:  for q.doc in Q do
 3:    for query in Q[q.doc] do
 4:      t_{len} ← len(query)
 5:      q_{qry} ← data.layout(query)
 6:      for doc in F do
 7:        if s(doc, q.doc) is True then
 8:          i ← 0
 9:          while i < len(t_{ref}) − q_{len} do
10:            t_{sub} ← t_{ref}[i : i + q_{len}]
11:            target ← data.obj(t_{sub})
12:            if y_{sim}(t_{sub}, q_{qry}) > 0.92 then
13:              dataset[query].insert(target)
14:            end if
15:            i ← i + 1
16:          end while
17:        end if
18:      end for
19:    end for
20:  end for
21:  End
22:  where data contains the hierarchical information
     about the dataset containing its constituent element
     positions and layout strings.
23:  where s is a function that checks the source of any
     two given forms.
24:  where y_{sim} is taken from Eq. 1.
```

FORM STRUCTURE SIMILARITY DETECTION

BACKGROUND

Content editing techniques are employed by computing devices to configure, format, and/or output text-based digital content. For instance, conventional content editing techniques involve authoring and/or editing a form, which includes structures such as checkboxes for providing input (e.g., yes/no checkboxes) and/or text fields for providing textual information. In various examples, it is useful to search the form for certain features such as to efficiently navigate within the form, to ensure consistency when authoring and/or editing the form, etc. Conventional content search techniques, however, are limited to text-based queries such as to find a word or phrase in various locations throughout the form. Accordingly, conventional content search techniques are constrained to mapping textual semantic similarities and thus have limited applicability.

SUMMARY

Techniques and systems for form structure similarity detection are described that enable detection of similar structural features within a document such as a digital form. In an example, a computing device implements a content processing system to receive a query snippet that depicts a query form structure, e.g., a table from a digital form. The content processing system generates a query layout string that includes a sequence of semantic indicators to represent the query form structure. The content processing system further generates candidate layout strings that represent additional form structures from a target document, e.g., the digital form, and calculates similarity scores between the query layout string and the candidate layout strings. Based on the similarity scores, the content processing system generates a target snippet for display that depicts a form structure that is structurally similar to the query form structure.

Using these techniques, the content processing system is operable to generate a training dataset that includes image pairs of snippets that are structurally similar. The content processing system leverages the training dataset to train a machine learning model to perform form structure similarity matching. Accordingly, the techniques described herein provide a robust machine learning modality to perform form structure similarity matching, as well as a low-resource technique to perform similar functionality with reduced consumption of computational resources and accordingly decreased power consumption.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ the form structure similarity detection techniques as described herein.

FIG. 3 depicts an example of layout strings based on query snippets.

FIG. 5 depicts an additional example of query snippets and corresponding target snippets.

FIG. 7 depicts an example of algorithms used to generate a training dataset.

Figure 9:
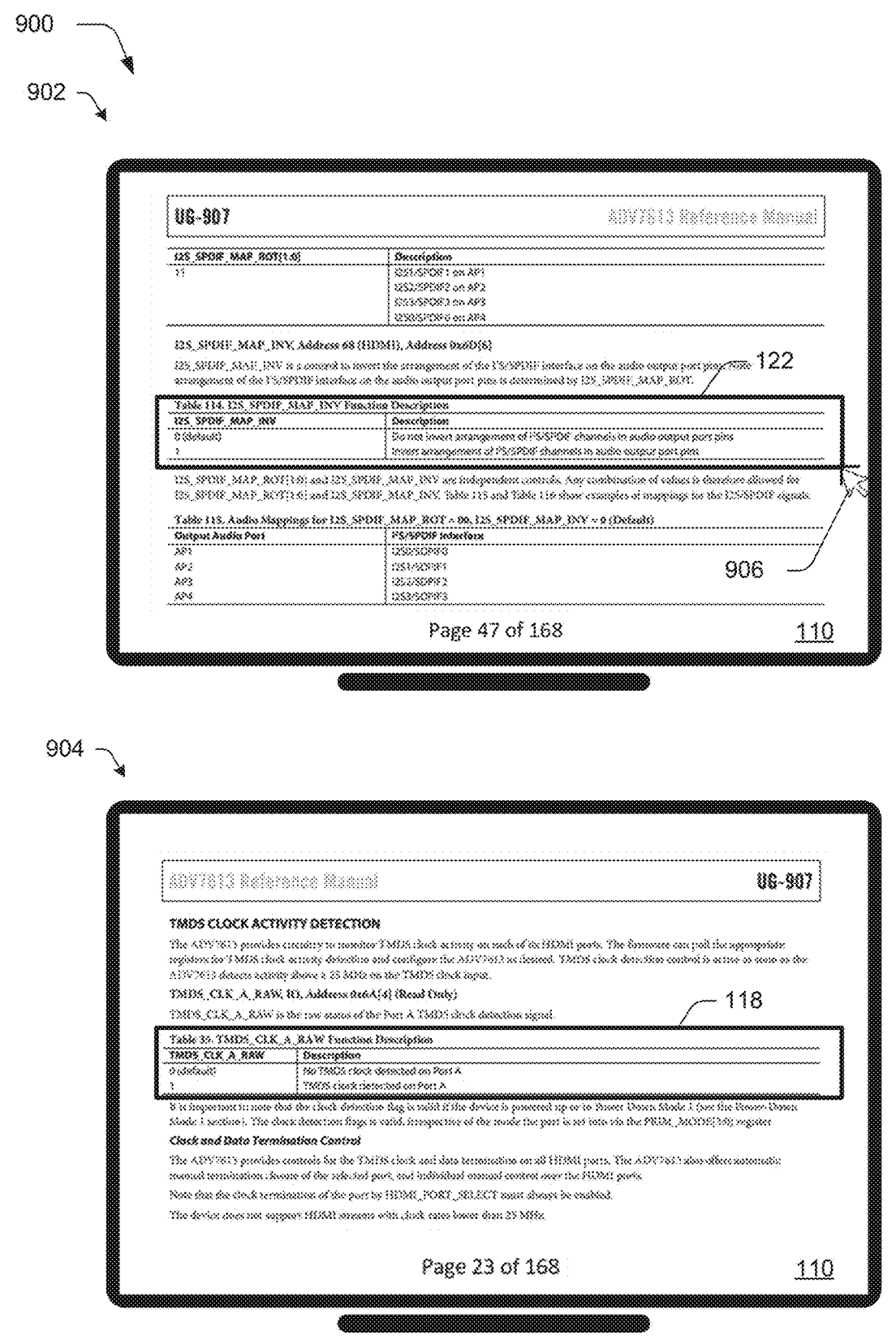

FIG. 9 depicts an example of form structure similarity detection using a machine learning model.

DETAILED DESCRIPTION

Overview

Figure 2:
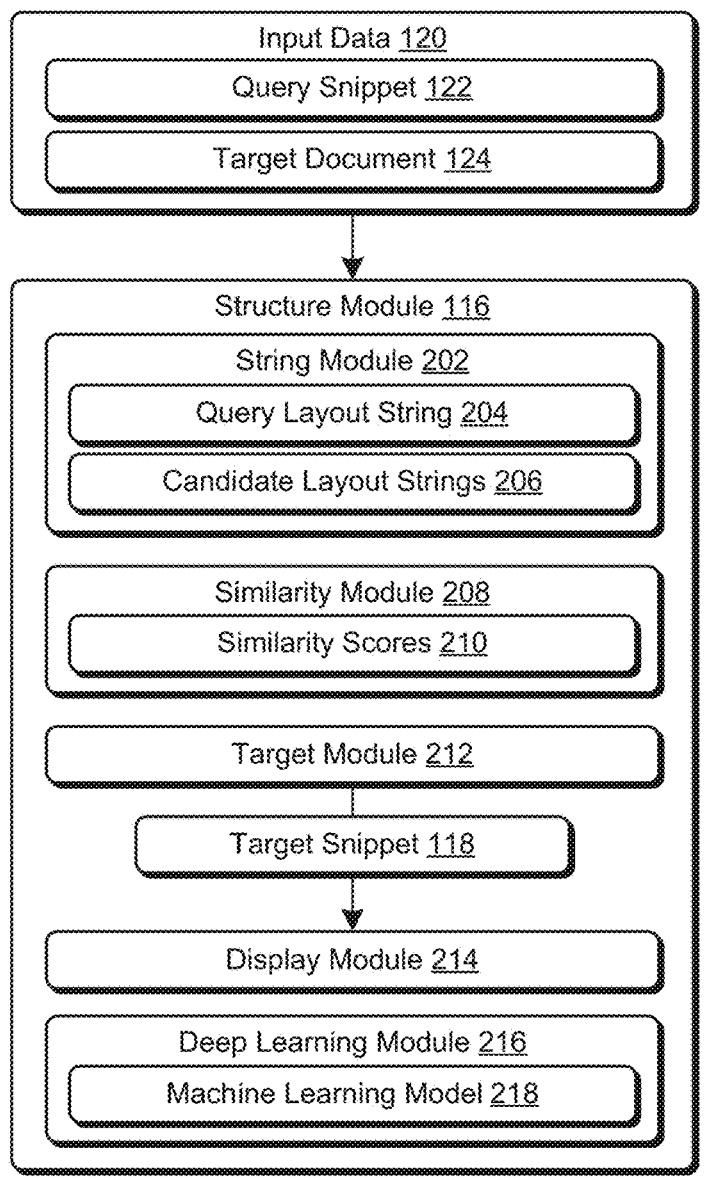
FIG. 2 depicts a system in an example implementation showing operation of the structure module of FIG. 1 in greater detail.

Content editing techniques are employed by computing devices to impart customizations to digital content, such as to format text included as part of an electronic document such as a form. The form, for example, contains form structures that include checkboxes for providing binary input (e.g., yes/no), text fields for providing textual information, tables, radio buttons, etc. that are organizable in a myriad of ways. When editing and/or authoring the form, in some instances it is desirable to search for similar features across the form. For instance, search functionality supports efficient navigation within the form and is used to ensure consistency when editing the form and/or search for inspiration features when authoring the form.

Conventional content search techniques provide for text-based search functionality. For instance, using conventional techniques a user launches a finding box (e.g., by using a "control-f" keyboard shortcut) to search for a particular word or phrase. The finding box returns locations of the particular word or phrase within the form. Other conventional techniques involve object recognition, such as by detection of objects of a particular "class," e.g., "humans", "dogs", "cars", etc. These techniques focus on content similarity within a natural image domain using a restricted set of classes.

However, documents such as forms are fundamentally defined by underlying structures of form features as well as by the content of the form. Conventional techniques that are limited to text-based and/or object-based searches do not support document searches related to structural elements of forms. Rather, conventional text-based and/or object-based search techniques have limited search domains that are unable to support structural similarity determinations and thus have constrained utility in the context of form editing and authoring.

Accordingly, techniques and systems for form structure similarity detection are described that overcome conventional challenges and limitations to identify target snippets that include a form structure that is structurally similar to a form structure included in a query snippet. In this way, the techniques described herein enable efficient detection of similar structural features within a document or multiple documents, regardless of differences between textual content of the structural features.

Consider an example in which a user is authoring a lengthy questionnaire, e.g., for a medical research project. The questionnaire includes various text fields and fillable objects for providing textual information as well as numerous checkboxes (e.g., yes/no checkboxes) associated with questions to provide binary information. As part of the authoring, the user determines that a particular question includes an error. For instance, the particular question includes text that recites "Do you drink alcohol?" and below includes text that recites "Yes" associated with a checkbox and text reciting "No" associated with a checkbox. However, the "Yes" text appears before the corresponding checkbox which is inconsistent with the rest of the questionnaire. Accordingly, the user desires to review the questionnaire to detect questions with similar improperly formatted checkboxes to correct the error. Conventional document search techniques are limited to searches based on textual semantic and/or object class similarities, and accordingly a user relying on such conventional techniques is forced to manually review the form to identify similar questions, which is time-consuming, computationally inefficient, and error-prone.

However, using the techniques described herein, a processing device implements a content processing system to receive a query snippet that represents a query form structure. Generally, a form structure represents one or more constituent features of a digital form such as text segments, input fields, tables, fillable areas, checkboxes, radio buttons, etc. In this example, the query snippet is based on an input to "draw" a bounding box around the particular question in a user interface of the processing device. Accordingly, the query form structure includes the text of the particular question, the "Yes" checkbox, and the "No" checkbox.

Based on the query snippet, the content processing system generates a query layout string to represent the query form structure. The query layout string includes a sequence of semantic indicators to represent the query form structure, such as text, widget, and newline semantic indicators. To generate the query layout string, the content processing system sorts constituent elements of the query snippet according to a natural reading order, and assigns one or more symbols, e.g., semantic indicators, to each constituent element. In this example, the query layout string represents the particular question as "<text><\n><text><widget><text><widget>" where "<text>" represents text elements, "<widget>" represents a fillable area such as the respective checkboxes, and "<\n>" represents a new line.

The content processing system further generates one or more candidate layout strings, such as by converting one or more portions of a target document to a layout string. Generally, the candidate layout strings represent one or more additional form structures, (e.g., text segments, input fields, tables, fillable areas, checkboxes, radio buttons, etc.) extracted from the target document. Continuing with the example, the content processing system generates candidate layout strings from the questionnaire. In some implementations, the content processing system converts the entire target document to a layout string and extracts candidate layout strings from the target document layout string. Additionally or alternatively, the content processing system filters form structures of the target document by type to conserve computational resources when generating candidate layout strings.

The content processing system then calculates similarity scores between the query layout string and the one or more candidate layout strings. The similarity scores, for instance, indicate a degree of structural similarity between the query form structure and the additional form structures represented by a candidate layout strings. In other words, the similarity scores indicate an extent that a form structure "looks like" the query form structure. In some examples, the similarity scores are based in whole or in part on a string similarity metric. For instance, the content processing system calculates a Levenshtein distance that quantifies a difference between the query layout string and the one or more candidate layout strings as part of calculating the similarity scores.

Based on the similarity scores, the content processing system determines one or more target snippets for display by the processing device that include form structures from the target document that are structurally similar to the query form structure. Continuing the above example, the content processing system displays target snippets that represent questions that are structurally similar to the particular question, e.g., with an improperly formatted checkbox following the text of the question. Accordingly, using the techniques described herein, the user is able to quickly locate similar structures to efficiently propagate corrections to ensure consistency throughout the questionnaire.

In various implementations, the content processing system leverages the above-described techniques to generate a training dataset of image pairs that include snippets with structural similarity above a threshold. The image pairs, for instance, are representative of a query snippet and a corresponding target snippet that include different content (e.g., text), however depict similar form structures. Conventional datasets are limited to annotated documents and/or natural image datasets, and thus fail to represent image pairs based on structural similarity.

The content processing system uses the training dataset to train a machine learning model to perform form structure similarity matching. For instance, the content processing system receives a query snippet that represents a query form structure and a target document. Using the trained machine learning model, the content processing system determines one or more target snippets that depict form structures that are structurally similar to the query form structure. Conventional machine learning approaches for document analysis are limited to object detection tasks and/or pixel level segmentation, and do not support structural based similarity search functionality.

Accordingly, the techniques described herein overcome conventional limitations and provide a robust machine learning modality to perform form structure similarity matching, as well as a low-resource technique to perform similar functionality with reduced consumption of computational resources and accordingly decreased power consumption. These techniques are applicable in a variety of contexts, such as in a review and correct tool to edit forms, as a search tool to locate similar structures within various document formats, as a suggestive authoring tool in a form authoring context, etc. Further discussion of these and other examples and advantages are included in the following sections and shown using corresponding figures.

Term Examples

As used herein, the term "form structure" refers to one or more constituent elements of a digital document such as text segments, input fields, tables, fillable areas, radio buttons, checkboxes, etc. In various examples, more than one constituent element are included in a form structure. An example form structure, for instance, includes a text-based prompt, a choice option defined by checkboxes, and a fillable area.

As used herein, the term "snippet" pertains to a depiction of one or more portions of form structures. A query snippet, for instance, depicts a region enclosed by a bounding box such as defined by user input. The query snippet includes a representation of a query form structure for which similar form structures are to be obtained. A target snippet, for instance, includes a representation of a form structure that is structurally similar to a query form structure.

As used herein, the term "layout string" refers to a semantic representation of a structural element of a document such as a form structure. In an example, a layout string includes a sequence of semantic indicators to represent a particular form structure. For instance, the layout string includes one or more text, widget, and/or newline semantic indicators. By way of example, "<text>" is a semantic indicator that represents text elements, "<widget>" represents widgets (e.g., input fields, fillable areas, radio buttons, checkboxes, etc.) and "<\n>" represents a new line.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the form structure similarity detection techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor components and/or resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital content 106 is illustrated as a structure module 116. This module is configured to generate a target snippet 118, for instance that depicts a feature of the digital content 106 that is visually and structurally similar to a search query. In the illustrated example, the structure module 116 receives input data 120 that includes a query snippet 122 as well as a target document 124. In this example, the target document 124 is a visa extension application form and the query snippet 122 includes a text-based question (e.g., "Have you ever lived in Northern Ireland?") as well as choice options associated with text, e.g., a "Yes" checkbox followed by text and a "No" checkbox followed by text. The query snippet 122, for instance, is determined based on a user input to draw a bounding box in the user interface 110 that includes the question.

The structure module 116 is operable to determine a structural similarity between the query snippet 122 and one or more portions of the target document 124. To do so, the structure module 116 generates a query layout string based on the query snippet 122 and candidate layout strings based on the target document 124. The respective layout strings include semantic identifiers that define structural features of the query snippet 122 and the target document 124. The structure module 116 calculates similarity scores between the query layout string and the candidate layout strings.

Based on the similarity scores, the structure module 116 generates a target snippet 118 that is structurally similar to the query snippet 122. In the illustrated example, for instance, the target snippet 118 is outlined in the user interface 110 and includes a text-based question (e.g., "Have you ever stayed in the United Kingdom beyond the end of your period of leave") as well as choice options associated with text, e.g., a "Yes" checkbox followed by text and a "No" checkbox followed by text. Accordingly, the techniques described herein support efficient and intuitive structure-based similarity searches, regardless of differences between textual content of the snippets. This functionality is not possible using conventional techniques, which are limited to searches based on textual semantic similarities and/or on restricted class object detection techniques. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Form Structure Similarity Detection

Figure 4:
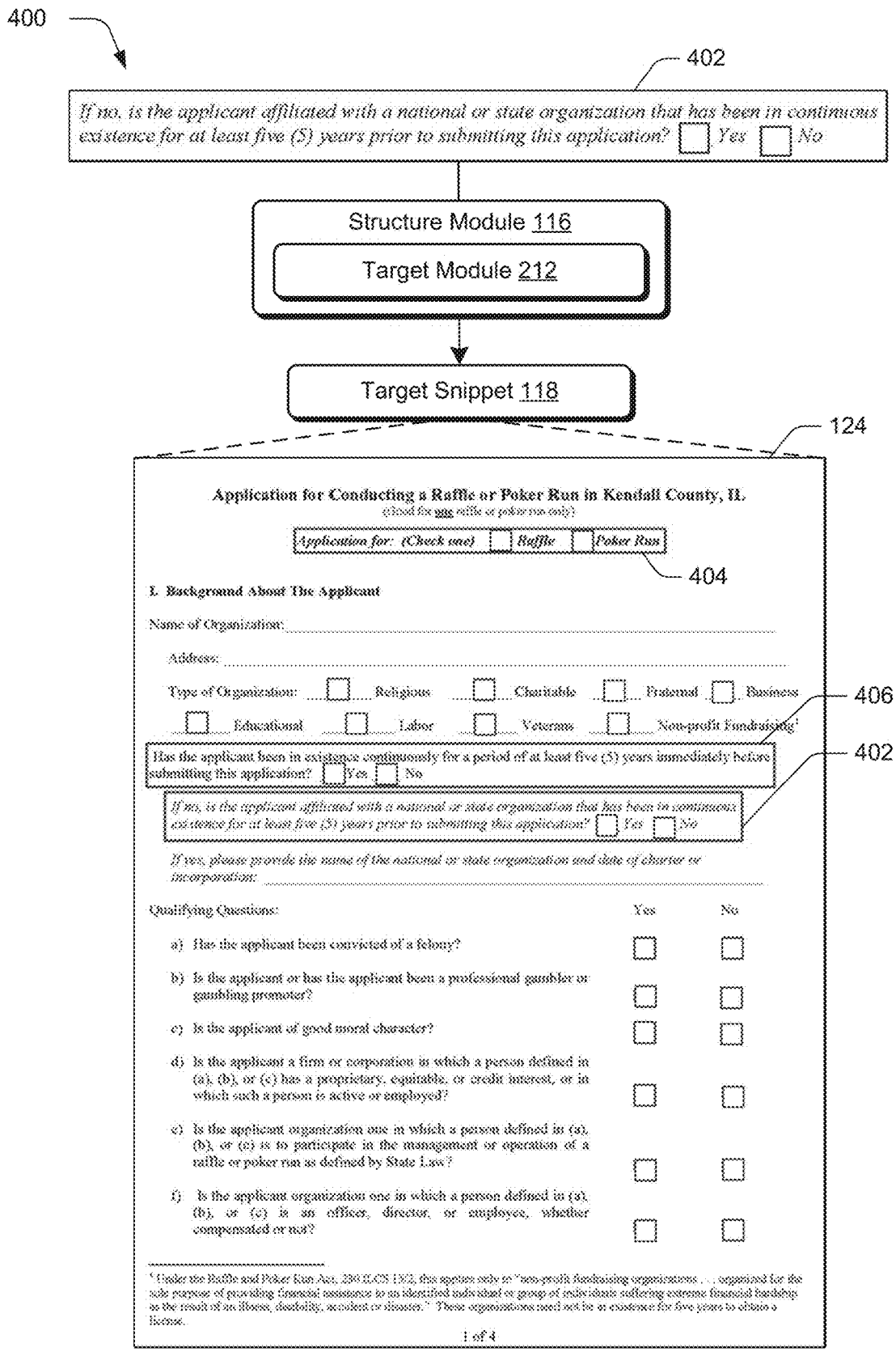
FIG. 4 depicts an example of generation of target snippets based on a query snippet.
Figure 6:
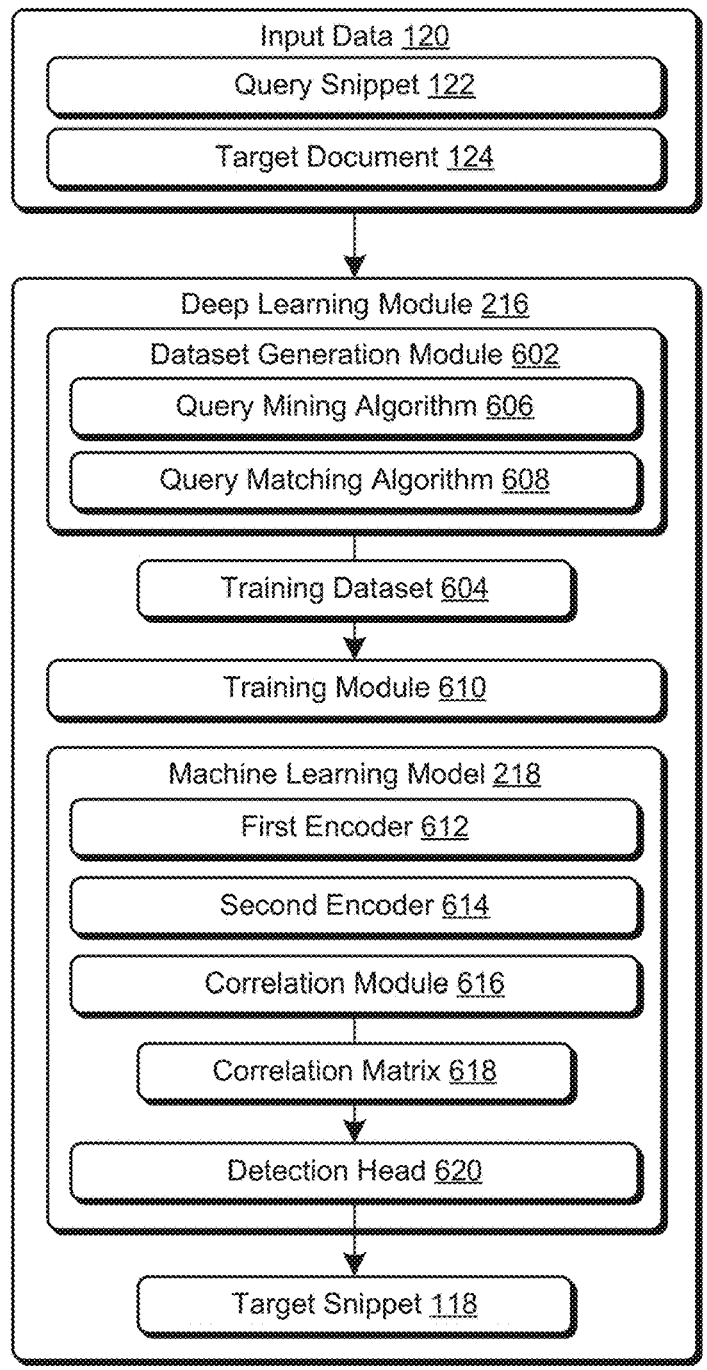
FIG. 6 depicts an example of operation of a deep learning module of FIG. 2 in greater detail.
Figure 8:
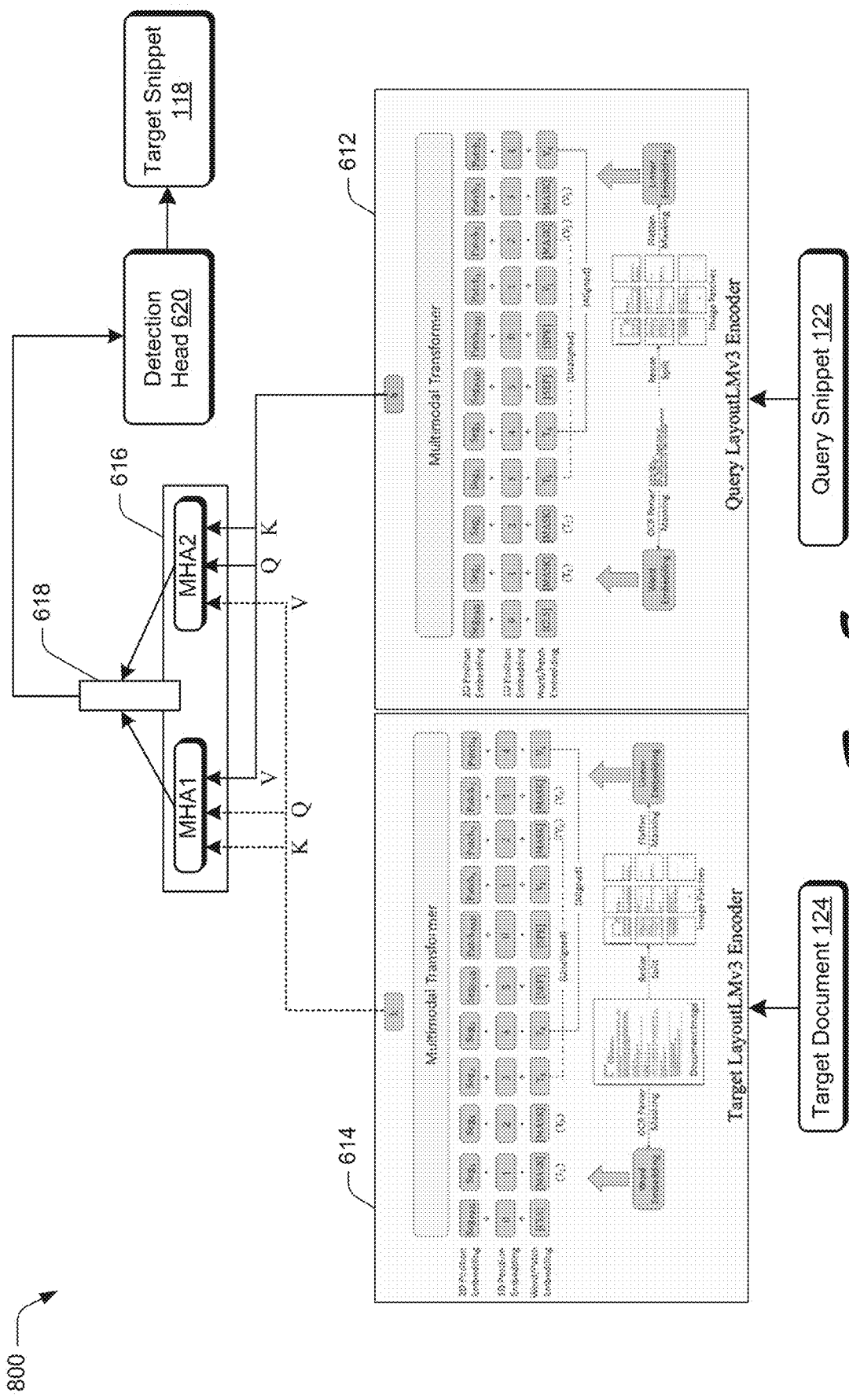
FIG. 8 depicts an example of a machine learning model architecture to perform form structure similarity detection.
Figure 10:
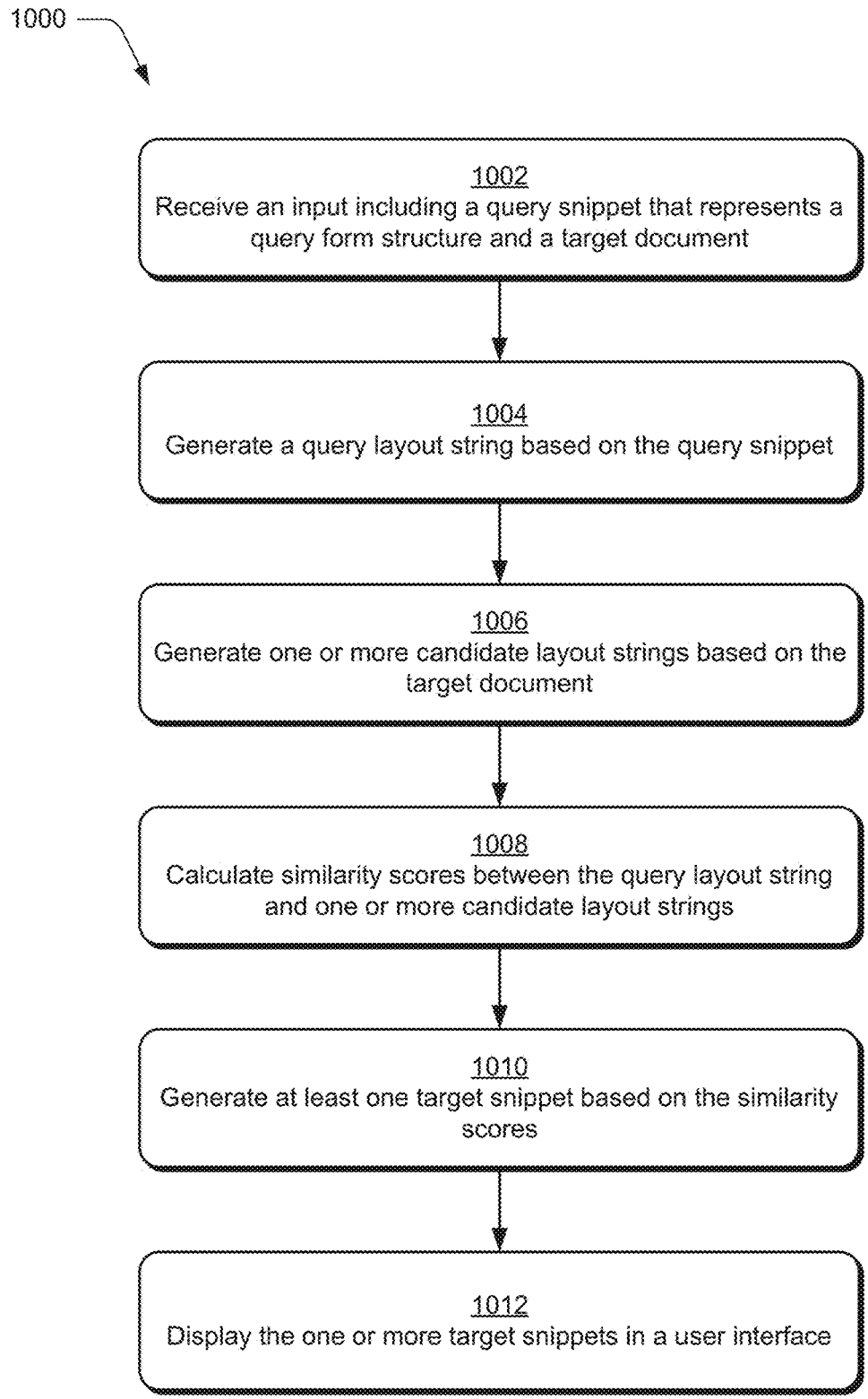
FIG. 10 is a flow diagram depicting a procedure in an example implementation of form structure similarity detection.
Figure 11:
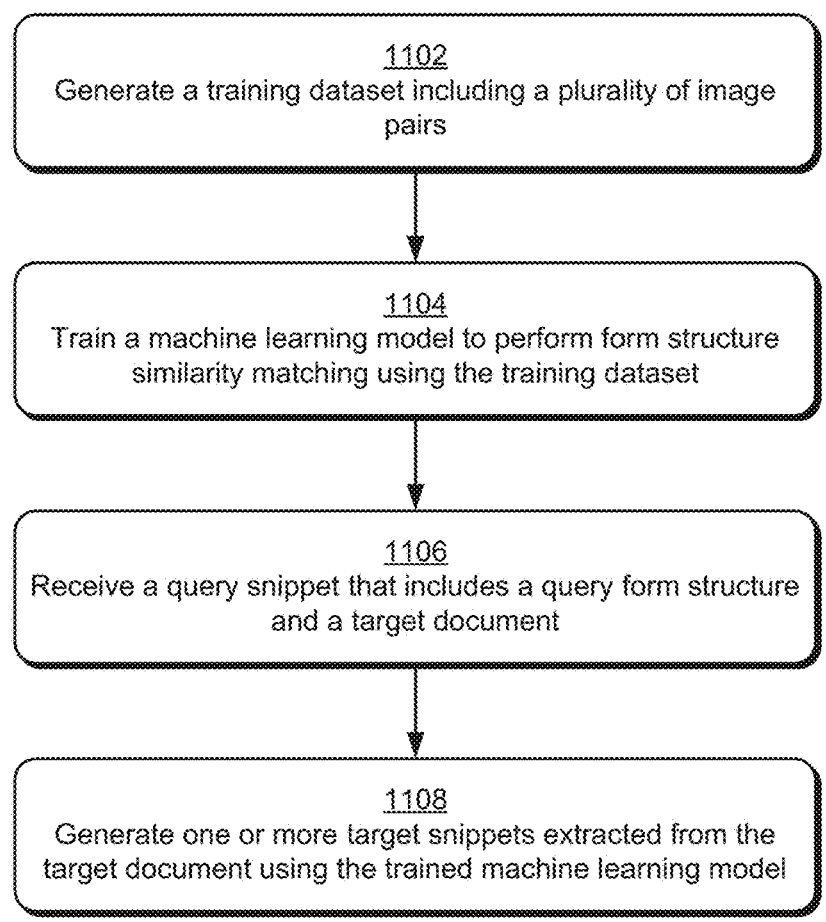
FIG. 11 is a flow diagram depicting a procedure in an example implementation of training a machine learning model to perform form structure similarity detection.

FIG. 2 depicts a system 200 in an example implementation showing operation of a structure module 116 of FIG. 1 in greater detail. FIG. 3 depicts an example 300 of layout strings based on query snippets. FIG. 4 depicts an example 400 of generation of target snippets based on a query snippet. FIG. 5 depicts an additional example 500 of query snippets and corresponding target snippets. FIG. 6 depicts an example 600 of operation of a deep learning module of FIG. 2 in greater detail. FIG. 7 depicts an example 700 of algorithms used to generate a training dataset. FIG. 8 depicts an example 800 of a machine learning model architecture to perform form structure similarity detection. FIG. 9 depicts an example 900 of form structure similarity detection using a machine learning model. FIG. 10 depicts a procedure 1000 in an example implementation of form structure similarity detection. FIG. 11 depicts a procedure 1100 in an example implementation of training a machine learning model to perform form structure similarity detection.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9 and in parallel to the procedure 1000 of FIG. 10 and the procedure 1100 of FIG. 11.

Low-Resource Form Structure Similarity Detection

FIG. 2 depicts a system 200 in an example implementation showing operation of a structure module 116 of FIG. 1 in greater detail. In this example, the structure module 116 is operable to receive input data 120 that includes a query snippet 122 and a target document 124 (block 1002). The query snippet 122 represents one or more query form structures. Generally, a form structure includes one or more constituent elements of a digital document such as text segments, input fields, tables, fillable objects, checkboxes, radio buttons, etc. A form structure, for instance, includes several constituent elements such as a question on a form that includes text, checkboxes, and several fillable areas. Example query snippets 122 that depict query form structures are depicted in FIG. 3, such as at 308, 312, and 316.

In one example, the query snippet 122 is based on an input, such as a user input to the user interface 110. For instance, the query snippet 122 is generated based on a user input to generate a bounding box around a particular form structure. The query snippet 122 is thus representative of the region enclosed by the bounding box. In another example, the query snippet 122 is generated automatically based on a selection of a particular form structure. By way of example, based on a selection of a particular table, the structure module 116 generates a query snippet 122 that includes the particular table. In various implementations, the structure module 116 generates the query snippet 122 automatically and without user intervention.

The target document 124 is representative of digital content that is to be searched to find similar form structures to the query form structure. In one or more examples, the query snippet 122 is obtained from the target document 124. Alternatively or additionally, the target document 124 does not include the query snippet 122. In some implementations, the target document 124 is representative of one or more digital documents, such as a corpus of digital documents to be searched.

The structure module 116 includes a string module 202 that is operable to generate a query layout string 204 based on the query snippet 122 (block 1004). Generally, the query layout string 204 includes a sequence of semantic indicators to represent the query form structure, such as text, widget, and newline semantic indicators. This is by way of example and not limitation, and a variety of semantic indicators are considered.

To generate the query layout string 204, the string module 202 extracts constituent elements from the query snippet 122, such as text, tables, fillable areas, etc. In an example, the string module 202 leverages one or more auto-tagging techniques of PDF tools to determine bounds for the constituent elements. The string module 202 is operable to sort the extracted constituent elements of the query snippet 122 such as according to a natural reading order, e.g., left-to-right and top-to-bottom. The string module 202 then categorizes each constituent element and associates one or more symbols, e.g., semantic indicators, with each constituent element type.

The string module 202 is further operable to generate one or more candidate layout strings 206 based on the target document 124 (block 1006). Generally, the candidate layout strings 206 represent one or more additional form structures, (e.g., text segments, input fields, tables, fillable areas, checkboxes, radio buttons, etc.) extracted from the target document 124. Similar to the query layout string 204, the one or more candidate layout strings 206 include a sequence of semantic indicators, such as text, widget, and newline semantic indicators.

In one example, the string module 202 converts the entire target document 124 to a layout string format and extracts the one or more candidate layout strings 206 from the target document layout string. Additionally or alternatively, the string module 202 filters the target document 124, such as by using one or more object recognition techniques to identity candidate form structures of the target document 124 that are of the same type as the query form structure. The string module 202 then generates the candidate layout strings 206 based on a type of candidate form structure. In this way, the techniques described herein support reduced consumption of computational resources when generating candidate layout strings 206.

FIG. 3 depicts an example 300 of various layout strings generated based on several different snippets in a first stage 302, a second stage 304, and a third stage 306. As illustrated in the first stage 302, the string module 202 receives a first snippet 308 and generates a first layout string 310 based on the first snippet 308. For instance, progressing from left to right, the first layout string 310 includes a <text> semantic indicator to represent the text "Did you successfully complete the course?". The <\n> semantic indicator indicates a new line, and the <widget><text><widget><text> semantic indicators represent the "Yes" and "No" checkboxes. The next <text> semantic indicator represents the text "(If no, please give reason below)" and the following <\n> indicates a new line. The next sequence of semantic indicators, <widget><\n><widget><\n><widget>, denote three lines of fillable areas, e.g., to provide textual input.

As illustrated in the second stage 304, a second snippet 312 depicts a table with prompts in a left column and fillable areas in a right-hand column. The string module 202 generates a second layout string 314 to represent the second snippet 312. In this example, the "<text><widget>" semantic indicators denote a row of the table, e.g., a text prompt followed by a fillable area. Accordingly, the four rows of the table are represented as a sequence of "<text><widget>" semantic indicators separated by "<\n>" semantic indicators in accordance with a natural reading order.

As illustrated in the third stage 306, a third snippet 316 depicts a numbered listing along with various instructions corresponding to each number. A third layout string 318 is generated to represent the third snippet 316. For instance, the "<text><text>" semantic indicators represent a row of the third snippet 316, e.g., a number followed by a corresponding instruction. Thus, the five rows of the third snippet 316 are represented as a sequence of "<text><text>" semantic indicators separated by "<\n>" semantic indicators. Accordingly, the string module 202 is operable to generate semantic representations that represent a structure of a variety of snippets which is not possible using conventional techniques.

The structure module 116 further includes a similarity module 208 that is operable to calculate one or more similarity scores 210 between the query layout string 204 and one or more candidate layout strings 206 (block 1008). The similarity scores 210, for instance, represent a degree of similarity between the respective candidate layout strings 206 and the query layout string 204. For example, a high similarity score indicates that a particular candidate layout string 206 is similar to the query layout string 204 and thus a form structure associated with the particular candidate layout string 206 is structurally similar to the query form structure.

In some examples, the similarity scores 210 are based in whole or in part on one or more string similarity metrics. For instance, the similarity module 208 calculates a Levenshtein distance that quantifies a difference between the query layout string 204 and the one or more candidate layout strings 206 as part of calculating the similarity scores 210. In various implementations, the similarity module 208 normalizes the Levenshtein distance based on a length of the query layout string 204.

Consider an example in which the query snippet 122 is represented as "A" and a snippet represented by a particular candidate layout string 206 is represented as "B". The similarity module 208 calculates a similarity score 210 for A and B as:

$$g_{sim}(A, B) = 1 - \frac{d(lstr_A, lstr_B)}{\text{length}(lstr_A)}$$

where $lstr_A$ and $lstr_B$ denote the layout strings of snippets A and B respectively and d represents a string similarity metric such as a Levenshtein distance. In an example with more than one candidate layout string 206, the similarity module 208 calculates a similarity score 210 for each respective candidate layout string 206.

The structure module 116 further includes a target module 212 that is operable to generate at least one target snippet 118 based on the similarity scores 210 (block 1010). Generally, the target snippet 118 depicts a region of the target document 124 represented by a candidate layout string 206. For instance, the target snippet 118 includes a representation of a form structure of the target document 124 that is structurally similar to the query form structure.

In an example, the target module 212 filters one or more candidate layout strings 206 that have a similarity score 210 above a threshold. For instance, the target module 212 generates a plurality of target snippets 118 that have a similarity score above the threshold. Alternatively or additionally, the target module 212 generates the target snippet 118 based on a "most similar" candidate layout string 206, such that the target snippet 118 depicts a region of the target document 124 represented by a candidate layout string 206 with a highest similarity score 210. In at least one example, the target module 212 determines that there is not a candidate layout string 206 with a similarity score 210 above a threshold value and generates a notification for display by the display device 112 indicating that there are no similar structures to the query snippet 122.

The structure module 116 includes a display module 214 that is operable to display the one or more target snippets 118 (block 1012). For instance, the display module 214 causes the one or more target snippets 118 to be displayed in the user interface 110 of the display device 112. In an example, the display module 214 displays the target snippet 118 within the context of the target document 124, such as by highlighting the target snippet 118 and/or navigating the target document 124 to a location to show the target snippet 118. Additionally or alternatively, the display module 214 is operable to segment the target snippet 118, such as to extract the target snippet 118 from the target document 124 for display.

FIG. 4 depicts an example 400 of generation of target snippets 118 based on query snippets 122. For instance, as shown in FIG. 4 the structure module 116 includes a target module 212. The target module 212 receives a query snippet 122, such as a query snippet 402 extracted from a target document 124. The query snippet 402 depicts a form structure that includes a text-based question, a first checkbox followed by text (e.g., a "Yes" checkbox), and a second checkbox followed by text, e.g., a "No" checkbox.

In accordance with the techniques described above, the target module 212 generates target snippets 118 based on the query snippet 402. As illustrated, the target module 212 generates a first target snippet 404 and a second target snippet 406 that are structurally similar to the query snippet 402. For instance, the first target snippet 404 and the second target snippet 406 both include a text entry, a first checkbox followed by text, and a second checkbox followed by text. In this way, the techniques described herein enable detection of similar form structures based on structural similarities which is not possible using conventional text and/or object-based approaches.

FIG. 5 depicts an example 500 of additional query snippets with corresponding target snippets in a first stage 502 and a second stage 504. As illustrated in first stage 502, using the techniques described above the structure module 116 receives a query snippet 506 and generates a corresponding target snippet 508 extracted from a target document 124. In this example, the query snippet 506 and the target snippet 508 have different textual content, however both include a question, two checkbox options followed by additional text, and a fillable area. As illustrated in second stage 504, the structure module 116 receives a query snippet 510 and generates a corresponding target snippet 512 from a target document 124. Both the query snippet 510 and the corresponding target snippet 512 depict a table with a similar layout and comparable structural features, despite having different sizes. Accordingly, the techniques described herein provide a computationally inexpensive modality to efficiently locate similar form structures within target documents 124.

Machine Learning Based Form Structure Similarity Matching

In some examples, the structure module 116 includes a deep learning module 216 that is operable to leverage the above-described techniques to generate training data, such as to train a machine learning model 218 to perform form structure similarity matching. Accordingly, the following discussion describes architecture of and operations involving a deep learning module, e.g., the deep learning module 216.

In various implementations, the deep learning module 216 includes a dataset generation module 602 that is operable to generate a training dataset 604 (block 1102). The training dataset 604, for instance, includes a plurality of image pairs, each respective image pair including snippets that depict structurally similar form structures. In one example, an image pair represents a training query snippet and a corresponding training target snippet. For instance, the image pair is representable as a query-target training pair "(Q, T)".

In an example to generate the training dataset 604, the dataset generation module 602 receives a sample document corpus, such as a forms dataset that includes an extensive variety of forms and form structures. In an example, the forms dataset is a Flamingo forms dataset such as described by Sarkar, et. al. *Document structure extraction using prior based high resolution hierarchical semantic segmentation.* In European Conference on Computer Vision, pp. 649-666. Springer, 2020. The dataset generation module 602 extracts a plurality of image pairs from the forms dataset, such that each image pair includes two structurally similar snippets with differing textual content.

To do so, the dataset generation module 602 implements a query mining algorithm 606 to generate first snippets for the image pairs, e.g., a training query snippet of a training query-target pair. The query mining algorithm 606 is configured to identify higher-order form structures from the sample document corpus to be used as the first snippets. Generally, higher-order form structures include form structures with more than one constituent element, e.g., more than one text segments, input fields, tables, fillable areas, radio buttons, checkboxes, etc. This is done to generate sufficiently complex image pairs to train the machine learning model 218. For instance, similarity matching for a lower-order form structure, e.g., a single text segment, returns a number of results that are not practical nor informative for a user. By extracting higher order form structures, the techniques described herein conserve computational resources while increasing performance of the machine learning model 218 once trained.

The dataset generation module 602 further leverages a query matching algorithm 608 to generate the image pairs. The dataset generation module 602 for instance, leverages the query matching algorithm 608 to identify form structures within the sample document corpus with a structural similarity to the form structures identified by the query mining algorithm 606, e.g., the higher-order form structures as described above. For instance, the query matching algorithm 608 generates second snippets for the image pairs, e.g., training target snippets of the query-target training pairs. In an example, the query matching algorithm 608 leverages a similarity score, such as the similarity score 210 as described above, to generate the image pairs.

Consider, for instance, a particular training query snippet identified by the query mining algorithm 606. The dataset generation module 602 is operable to convert the particular training query snippet to a layout string, such as by using the techniques described above. The dataset generation module 602 is further operable to convert the forms dataset into one or more layout strings. The dataset generation module 602 identifies training target snippets from the forms dataset that are structurally similar to the particular training query snippet such as by calculating similarity scores between the example training query snippet and one or more candidate training target snippets in accordance with the techniques described above. The dataset generation module 602 is further operable to filter the forms dataset by structure type when generating the training dataset 604 to reduce consumption of computational resources. The dataset generation module 602 then iterates this process for each snippet identified by the query mining algorithm 606 to generate the training dataset 604.

FIG. 7 depicts an example 700 of algorithms to generate the training dataset 604, for instance an example query mining algorithm 702 and an example query matching algorithm 704. It should be noted that this is by way of example and not limitation, and the query mining algorithm 606 and the query matching algorithm 608 are configurable in a variety of ways. As illustrated, the example query mining algorithm 702 generates a set of training query snippets "Q" (e.g., higher-order form structures) based on a forms dataset "F". Based on the set of training query snippets "Q" and on the forms dataset "F", the example query matching algorithm 704 determines one or more corresponding training target images for each training query snippet in the set of training query snippets.

The example query matching algorithm 704 determines the training target images based in part on a similarity score. In this example, the similarity score of the example query matching algorithm 704 is defined as:

$$g_{sim}(A, B) = 1 - \frac{d(lstr_A, lstr_B)}{\text{length}(lstr_A)}$$

where $lstr_A$ denotes a layout string of a first snippet "A" (e.g., a training query snippet) and $lstr_B$ denotes a layout string of a second snippet "B", e.g., a training target snippet. Further, "d" represents a string similarity metric such as a Levenshtein distance. In this way, the dataset generation module 602 generates the training dataset 604 that is based on structural similarities between snippets rather than textual-based similarities, which is not possible using conventional techniques.

The deep learning module 216 further includes a training module 610 that is operable to train the machine learning model 218 to perform form structure similarity matching using the training dataset 604 (block 1104). The training module 610, for instance trains the machine learning model 218 to receive a query snippet 122 and a target document 124 and generate one or more target snippets 118 based on a structural similarity with the query snippet 122. A variety of neural networks and/or types of machine learning models are considered, as well as a variety of training types and/or training schemes. In one example, the machine learning model 218 is a task-adapted LayoutLMv3 model, as further described below with respect to FIG. 8.

Once trained, the machine learning model 218 is operable to receive a query snippet that includes a query form structure and a target document (block 1106). As described above, the query snippet 122 represents one or more query form structures. For example, the one or more query form structures include one or more constituent elements of a digital document such as text segments, input fields, tables, fillable objects, checkboxes, radio buttons, etc. In an example, the query snippet 122 is based on an input, such as a user input to the user interface 110 to generate a bounding box around a particular form structure.

The target document 124 is representative of digital content that is to be searched to find similar form structures to the query form structure. In one or more examples, the query snippet 122 is obtained from the target document 124. Alternatively or additionally, the target document 124 does not include the query snippet 122. In some implementations, the target document 124 is representative of one or more digital documents, such as a corpus of digital documents to be searched.

The deep learning module 216 is operable to generate one or more target snippets 118 extracted from the target document 124 using the trained machine learning model 218 (block 1108). As described above, the target snippets 118 include form structures that are structurally similar to the query form structure. In an example, the machine learning model 218 generates the target snippet 118 by encoding the query snippet 122 using a first encoder 612. The machine learning model 218 further encodes the target document 124 using a second encoder 614.

The machine learning model 218 further includes a correlation module 616 that is operable to compute a correlation between the encoded query snippet 122 and the encoded target document 124. For instance, the correlation module 616 includes one or more attention blocks that are employed to determine a correlation matrix 618 between the encoded query snippet 122 and the encoded target document 124. The correlation module 616 is further operable to concatenate and transform the correlation matrix 618 to an appropriate size and dimensionality. Based on the correlation matrix 618, the machine learning model 218 generates the one or more target snippets 118. For instance, the machine learning model 218 includes a detection head 620 that is operable to generate the target snippets 118 based on the correlation matrix 618.

FIG. 8 depicts an example 800 of architecture of the machine learning model 218. This architecture is by way of example and not limitation, and a variety of machine-learning architectures are considered. In this example, the machine learning model 218 receives a query snippet 122 and a target document 124. As illustrated, the machine learning model 218 includes a first encoder 612 to encode the query snippet 122 and a second encoder 614 to encode the target document 124. In this example, the first encoder 612 and the second encoder 614 are LayoutLMv3 encoders, which are jointly operable to encode image, text, and bounding boxes. Architecture of the first encoder 612 and the second encoder 614 is depicted, and both include sequential multihead attention layers, layer norm, and fully connected layers.

The machine learning model 218 includes a correlation module 616 that is operable to compute a correlation between the encoded query snippet 122 and the encoded target document 124. In this example, the correlation module 616 includes two multi-head attention ("MHA") attention blocks represented as MHA1 and MHA2 in the illustrated example. The MHA attention blocks takes as input a query (Q), a key (K) and a value (V) from each of the encoded query snippet 122 and the encoded target document 124. In this example, a Q and a K from the target encodings (e.g., the encoded target document 124) are used by MHA1, while a V is used by MHA2. Similarly, a Q and a K from the query encodings (e.g., the encoded query snippet 122) are used by MHA2, while a V is used by MHA1. This is done to quantify a relative importance of the query snippet 122 within the target document 124. The correlation module 616 is employed to concatenate outputs of the MHA blocks to generate a correlation matrix 618, such as a feature vector that encodes a correlation between the query and target encodings.

The machine learning model 218 further includes a detection head 620 that is operable to generate one or more target snippets 118 based on the correlation matrix 618. In this example, the detection head 620 is a Mask RCNN detection head that performs object detection and/or bounding box detection functionality based on the correlation matrix 618 to generate the one or more target snippets 118. In another example, the detection head 620 includes a FasterRCNN head. The detection head 620 is further operable to apply one or more additional post processing techniques, e.g., non-maximal suppression, confidence thresholding, etc., as part of generating the target snippets 118. In this way, the machine learning model 218 is able to detect snippet layouts that are unseen during training, expanding the applicability of the form structure similarity detection techniques described herein.

An example 900 of the functionality of the machine learning model 218 to perform form structure similarity detection is depicted in FIG. 9 in a first stage 902 and a second stage 904. As illustrated in first stage 902, a user is reviewing a reference manual in a user interface 110, and desires to find similar structures to a particular table. Accordingly, the user provides a user input 906 to draw a bounding box around the particular table to generate a query snippet 122.

Using the techniques described above, the machine learning model 218 is operable to generate a target snippet 118 based on the query snippet 122 and a target document 124, which in this example is the reference manual. As illustrated in second stage 904, the target snippet 118 is identified in the user interface 110. The target snippet 118 depicts a table with a similar structure to the particular table depicted in the query snippet 122, however, includes different text content. This functionality is not possible using conventional techniques, which are limited to searches based on textual semantic similarities and/or on restricted class object detection techniques. Accordingly, the techniques described herein overcome conventional limitations by providing a robust machine learning modality to perform form structure similarity matching for a variety of snippet layouts and structural features.

Example System and Device

Figure 12:
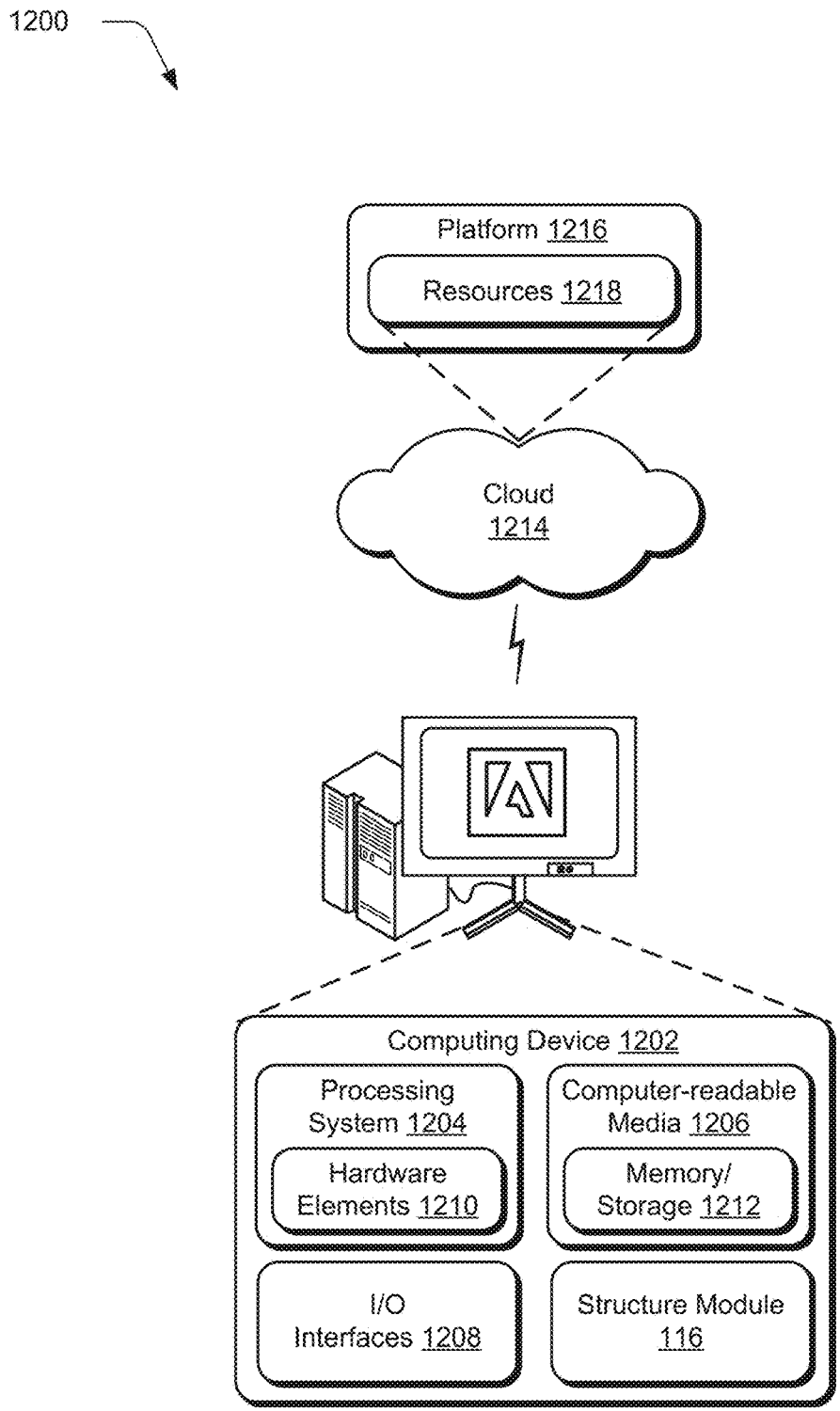
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the structure module 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, in a user interface of a processing device, a query snippet that includes a query form structure;
   generating, by the processing device, a query layout string based on the query snippet that includes a sequence of semantic indicators to represent the query form structure;
   calculating, by the processing device, similarity scores between the query layout string and one or more candidate layout strings, the one or more candidate layout strings representing one or more additional form structures; and
   displaying, by the user interface of the processing device, a target snippet based on the similarity scores, the target snippet including an additional form structure that is structurally similar to the query form structure.

2. The method as described in claim 1, wherein the query form structure includes one or more of a text segment, a table, or a fillable object.

3. The method as described in claim 1, wherein the generating the query layout string includes sorting constituent elements of the query snippet according to a natural reading order.

4. The method as described in claim 1, wherein the query layout string represents the query form structure using text, widget, and newline semantic indicators.

5. The method as described in claim 1, wherein the calculating the similarity scores includes calculating a Levenshtein distance between the query layout string and the one or more candidate layout strings.

6. The method as described in claim 5, wherein the calculating the similarity scores includes normalizing the Levenshtein distance based on a length of the query layout string.

7. The method as described in claim 1, wherein the processing device generates the one or more candidate layout strings by converting a target document to a target document layout string and extracting the one or more candidate layout strings from the target document layout string.

8. The method as described in claim 1, wherein the query snippet is based on a bounding box including the query form structure.

9. A system comprising:
   a memory component; and
   a processing device coupled to the memory component, the processing device to perform operations including:
      receiving an input including a query snippet that represents a query form structure and a target document;
      generating a query layout string based on the query snippet that includes a sequence of semantic indicators to represent the query form structure;
      calculating similarity scores between the query layout string and one or more candidate layout strings, the one or more candidate layout strings representing one or more form structures extracted from the target document; and
      displaying at least one target snippet based on the similarity scores that includes a form structure from the target document that is structurally similar to the query form structure.

10. The system as described in claim 9, wherein the query form structure includes one or more of a text segment, a table, or a fillable object.

11. The system as described in claim 9, wherein the generating the query layout string includes sorting constituent elements of the query snippet according to a natural reading order.

12. The system as described in claim 9, wherein the query layout string and the one or more candidate layout strings represent respective form structures using text, widget, and newline semantic indicators.

13. The system as described in claim 9, wherein the calculating the similarity scores includes calculating a Levenshtein distance between the query layout string and the one or more candidate layout strings.

14. The system as described in claim 13, wherein the calculating the similarity scores includes normalizing the Levenshtein distance based on a length of the query layout string.

15. The system as described in claim 9, wherein the query snippet is based on a bounding box including the query form structure.

16. A non-transitory computer-readable storage medium storing executable instructions, which when executed by a processing device, cause the processing device to perform operations comprising:
   generating a training dataset including a plurality of image pairs, each respective image pair including snippets that depict structurally similar form structures;
   training a machine learning model to perform form structure similarity matching using the training dataset;
   receiving a query snippet that includes a query form structure and a target document; and
   generating, by the trained machine learning model, one or more target snippets extracted from the target document that include form structures that are structurally similar to the query form structure.

17. The non-transitory computer-readable storage medium as described in claim 16, wherein the generating the one or more target snippets includes:
   encoding, by the trained machine learning model, the query snippet using a first encoder;
   encoding, by the trained machine learning model, the target document using a second encoder;
   determining, by one or more attention blocks of the machine learning model, a correlation matrix between the encoded query snippet and the encoded target document; and
   generating the one or more target snippets based on the correlation matrix.

18. The non-transitory computer-readable storage medium as described in claim 16, wherein the generating the training dataset includes using a query mining algorithm to identify higher-order form structures from a sample document corpus and using a query matching algorithm to identify form structures within the sample document corpus with a structural similarity to the form structures identified by the query mining algorithm.

19. The non-transitory computer-readable storage medium as described in claim 18, wherein the query matching algorithm is configured to convert form structures to layout strings and determine a similarity between layout strings by computing a Levenshtein distance.

20. The non-transitory computer-readable storage medium as described in claim 16, wherein the query form structure includes one or more of a text segment, a table, or a fillable object.

* * * * *